3,135,724
THREE COMPONENT CATALYST FOR POLYMERIZING OLEFIN CONTAINING A MIXTURE OF ALKYL ALUMINUM DIHALIDE, TITANIUM TRICHLORIDE AND AN ALKALI METAL AMIDE
John A. Price, Swarthmore, Pa., assignor, by mesne assignments, to FMC Corporation, San Jose, Calif., a corporation of Delaware
No Drawing. Filed Mar. 10, 1961, Ser. No. 94,672
20 Claims. (Cl. 260—93.7)

This invention relates to a novel catalyst system for the polymerization of propylene and higher alpha-olefins, and more particularly to a three-component catalyst system consisting of titanium trichloride, and alkyl aluminum dihalide, and an alkali metal amide.

It is known that alpha-olefins may be polymerized in the presence of catalysts comprising a transition metal halide such as titanium chlorides in combination with an aluminum alkyl or dialkyl aluminum halide such as triethyl aluminum or diethyl aluminum monochloride to form solid crystalline polymers having utility in the fabrication of shaped articles, films, and fibers. However, it has not been found possible heretofore to use an alkyl aluminum dihalide as an active component of this type of catalyst system even though these dihalides are much less expensive than the alkyl aluminum compounds used thus far. Thus, Stuart and Khelghatian show in U.S. Patent 2,967,206 that alkyl aluminum dihalides in conjunction with titanium halides effect polymerization of propylene and higher olefins to oily polymers, but that no solid polymers are disclosed therein as resulting from the use of this catalyst system.

It is an object of this invention to provide a coordination catalyst system utilizing an alkyl aluminum dihalide as the organometallic component of the catalyst which will polymerize propylene and higher olefins to solid crystalline polymers in commercially attractive yields.

It has been found according to the present invention a catalyst system containing titanium trichloride, an alkyl aluminum dihalide and an alkali metal amide is effective in polymerizing propylene, and other 1-alkenes containing as many as 8 carbon atoms, to solid crystalline polymers. In a specific embodiment of this invention, an activated titanium trichloride is used with the alkali metal amide and the alkyl aluminum dihalide. This activated titanium trichloride is defined herein as being predominately amorphous and may be prepared by ball, or rod, milling crystalline titanium trichloride, prepared by the reduction of titanium tetrachloride with hydrogen or aluminum until, as determined by X-ray diffraction, it possesses less than 30% of the crystalline structure of the crystalline titanium trichloride prior to ball or rod milling. In practice, the amount of crystallinity is generally 20% or less, and preferably it is 10% or less. Unlike the crystalline titanium trichloride from which it is derived, the predominately amorphous titanium trichloride will catalyze the preparation of solid polymers of propylene and higher 1-alkenes when it is used in combination with an alkyl aluminum dihalide. However, the amount of solid polymer so prepared is exceedingly small in amount, and such solid polymers can be obtained with such a system only when large, uneconomical amounts of the catalyst composition are used. It has been found, according to the present invention, that increases in polymerization yields as high as forty fold may be obtained in the catalyst containing an alkyl aluminum dihalide and predominately amorphous titanium trichloride catalyst system by complexing this system with an alkali metal amide.

In carrying out polymerizations in accordance with the present invention, the catalyst components are generally dissolved or suspended in an inert hydrocarbon solvent such as hexane, heptane, or octane, or mixtures thereof, in an appropriate reaction vessel, in the absence of oxygen and moisture. The catalyst-containing solvent is then usually brought to a temperature in the range of 25° C. to 150° C., preferably 60° C. to 80° C., and the olefin to be polymerized is introduced into the reaction vessel. When the olefin is a liquid at reaction temperatures, such as 4-methylpentene-1, atmospheric pressure may be used, but when the olefin is normally gaseous, such as propylene or butene-1, moderately elevated pressures are preferably used, as from 20 p.s.i.g. to 500 p.s.i.g. in order to increase the amount of olefin dissolved in the solvent, and thus speed the reaction.

The aluminum component of the catalyst system of this invention may be any alkyl aluminum dihalide, e.g., ethyl aluminum dichloride, propyl aluminum dichloride, butyl aluminum dichloride or the corresponding bromine or iodine analog, as well as alkyl aluminum dihalides the alkyl radicals of which contain greater numbers of carbon atoms than those illustrated above. The amide component of this invention may be any alkali metal amide, e.g., sodamide, lithium amide, potassium amide, and the like, with sodamide being preferred. The mol ratio of alkyl aluminum dihalide to titanium trichloride in the catalyst system should be generally from 0.2:1 to 10:1, and is preferably from about 1.5:1 to 3:1. The mol ratio of alkyl aluminum dihalide to alkali metal amide should not be below 0.3:1 since at this ratio polymerization is quite slow, nor should this ratio go above about 5:1. A practical working ratio lies in the range between about 0.6:1 to about 3:1, with the preferred ratio lying in the range between about 0.85:1 to 1.5:1.

In order that those skilled in the art may more fully appreciate the nature of my invention and the manner of carrying it out, the following examples are given. In all examples the titanium component of the catalyst system was prepared by reducing titanium tetrachloride with aluminum and then ball milling the resultant titanium trichloride until its crystallinity was below about 10% of the original trichloride as determined by X-ray analysis.

*Example I*

A heavy walled, pressure-type glass polymer bottle having a capacity of 185 mls. was charged with 50 ml. of heptane, 0.9 ml. of a 1.78 M solution of ethyl aluminum dichloride in heptane, and 0.126 gram of predominately amorphous titanium trichloride. The bottle was sealed with a crown cap containing an oil-resistant liner and placed in a constant temperature bath maintained at 72° C. The contents of the bottle were maintained in agitation by means of a Teflon-coated magnetic stirrer.

After aging for 10 minutes, the bottle was pressured with 40 p.s.i.g. of propylene which was maintained for a period of 4 hours. The unreacted propylene was then vented and the cooled slurry was treated with 25 ml. of isopropanol and 50 ml. of methanol. The polymer was collected on a sintered glass funnel, and was dried and weighed. The yield of solid pentane-insoluble polymer was 0.1 gram.

Example II

A polymer bottle was charged with 50 ml. of heptane, 0.9 ml. of 1.78 M heptane solution of ethyl aluminum dichloride, and 60.8 milligrams of sodamide. The bottle was then capped and agitated in the 72° C. bath for 30 minutes. The bottle was then cooled and opened and 0.121 gram of predominately amorphous titanium trichloride was added. The mol ratio of ethyl aluminum dichloride to titanium trichloride to sodamide was 2.0:1.0:2.0. The bottle was then recapped, put back in the 72° C. bath, and the catalyst was aged for 10 minutes. The bottle was then pressured with propylene to 40 p.s.i.g., and this pressure was maintained for four hours while agitating the contents of the bottle. The catalyst activity was then killed by the addition of 10 ml. of methanol and 50 ml. of heptane. The polymer was collected on a sintered glass funnel and washed successively with 50 ml. of heptane, 50 ml. of isopropanol, 100 ml. of water, and 100 ml. of methanol. It was then dried in a vacuum oven for 16 hours at 60° C. The solid polypropylene recovered weighed 3.6 grams, 83.3 weight percent of which was pentane-insoluble.

Example III

Example II was repeated using different mol ratios of aluminum to titanium to sodium; at a mol ratio of 2.0:1.0:1.6 the yield of solid polymer was 3.3 g.

Example IV

Example I was repeated using 0.134 g. of titanium trichloride and sufficient ethyl aluminum dichloride to provide a catalyst composition having an Al:Ti mol ratio of 2.0:1.0. Moreover, 4-methylpentene-1 was substituted for propylene, and the polymerization reaction was run for 22 hours. There resulted 5.9 g. of poly-(4-methylpentene-1); 93.2 weight percent thereof was a pentane-soluble oil and only the remaining 6.8 percent was a solid pentane-insoluble polymer.

Example V

Example IV was repeated except that sufficient sodamide was added to provide a catalyst composition having an Al:Ti:Na mol ratio of 2.0:1.0:1.7 and the polymerization reaction was run for 16 hours. There resulted 10.9 g. of poly-(4-methylpentene-1), 86.2 weight percent of which was pentane-insoluble.

Example VI

Example I was repeated except that 6.3 millimols of titanium trichloride and an Al:Ti mol ratio of 1.8:1.0 were used. There resulted 2 g. of solid polypropylene.

Example VII

Example VI was repeated except that sufficient sodamide was added to give a catalyst composition having an Al:Ti:Na mol ratio of 1.8:1.0:1.5. There resulted 21.7 g. of solid polypropylene.

Examples VIII and IX

Example II was repeated with various Al:Ti:Na mol ratios. At a mol ration of 2.0:1.0:1.0, the yield of solid pentane-insoluble polypropylene was 1.3 g., and at a mol ratio of 2.0:1.0:2.5, the yield of solid pentane-insoluble polypropylene was 2.1 g.

Example X

A water-jacketed polymerization reactor was charged with n-heptane, predominately amorphous titanium trichloride, and ethyl aluminum dichloride in quantities such that the heptane contains 0.35 g. of titanium trichloride per 100 cc. and the aluminum to titanium mol ratio is 2:1. Anhydrous and oxygen-free conditions were maintained during the addition of the catalyst system and during the polymerization stage. Propylene was then introduced into the reactor until pressure reached 140 p.s.i.g. and the temperature was increased to 160° F., at which point polymerization commenced and was continued for 2 hours while continuously introducing propylene into the reactor in sufficient quantities to maintain the pressure at 140 p.s.i.g. At the end of this time period the unconsumed propylene was vented and methanol was added to inactivate the catalyst system. Upon working up the reaction product it was found that 77.2 weight percent of the polymer produced was soluble in pentane and that the rate of formation of pentane-insoluble polypropylene was 0.001 pound of polymer per gallon of heptane per hour.

Example XI

Example X was repeated except that sufficient sodamide was added to the catalyst composition to give an aluminum to titanium to sodium mol ration of 2.1:1. In contrast to Example X, only 15 weight percent of the polypropylene was soluble in pentane and the rate of formation of pentane-insoluble polymer was increased to 0.04 pounds of polypropylene per gallon of heptane per hour. Moreover, 98.4 weight percent of the pentane-insoluble polymer was insoluble in boiling heptane.

Example XII

Example V was repeated except that lithium amide was substituted for sodamide. There resulted 2.9 g. of pentane-insoluble poly-(4-methylpentene-1).

While the foregoing examples are directed to the polymerization of propylene and 4-methylpentene-1, my new catalyst system is also effective to polymerize other alpha-olefins, such as butene-1, and pentene-1.

The invention claimed is:

1. In the polymerization of 1-alkenes having from 3 to 8 carbon atoms to form solid crystalline polymers, the improvement which comprises catalyzing the polymerization with a mixture consisting essentially of an alkyl aluminum dihalide, titanium trichloride, and an alkali metal amide $MNH_2$ wherein M is an alkali metal.

2. The process of claim 1 wherein said titanium trichloride is predominately amorphous.

3. The process of claim 2 wherein said alkene is propylene.

4. The process of claim 2 wherein the mol ratio of alkyl aluminum dihalide to titanium trichloride is from about 0.2:1 to about 10:1 and the mol ratio of alkyl aluminum dihalide to alkali metal amide is from about 0.3:1 to about 5:1.

5. The process of claim 4 wherein said alkene is propylene.

6. The process of claim 4 wherein the aluminum to alkali metal ratio is from about 0.6:1 to about 3:1.

7. The process of claim 6 wherein said alkene is propylene.

8. The process of claim 4 wherein said aluminum to titanium ratio is from about 1.5:1 to about 3:1.

9. The process of claim 8 wherein said alkene is propylene.

10. The process of claim 4 wherein the aluminum to alkali metal ratio is from about 0.85:1 to about 1.5:1.

11. The process of claim 10 wherein said alkene is propylene.

12. The process of claim 10 wherein said aluminum to titanium ratio is from about 1.5:1 to about 3:1.

13. The process of claim 12 wherein said alkene is propylene.

14. A polymerization catalyst consisting essentially of an alkyl aluminum dihalide, titanium trichloride and an alkali metal amide $MNH_2$ wherein M is an alkali metal.

15. The composition of claim 14 wherein said titanium trichloride is predominately amorphous.

16. The composition of claim 15 wherein the mol ratio of alkyl aluminum dihalide to titanium trichloride is from about 0.2:1 to about 10:1 and the mol ratio of alkyl aluminum dihalide to alkali metal amide is from about 0.3:1 to about 5:1.

17. The composition of claim 16 wherein the aluminum to alkali metal ratio is between about 0.6:1 to about 3:1.

18. The composition of claim 16 wherein said aluminum to titanium ratio is from about 1.5:1 to about 3:1.

19. The composition of claim 16 wherein the aluminum to alkali metal ratio is from about 0.85:1 to about 1.5:1.

20. The composition of claim 19 wherein said aluminum to titanium ratio is from about 1.5:1 to about 3:1.

References Cited in the file of this patent

UNITED STATES PATENTS

| | | |
|---|---|---|
| 2,849,432 | Kibler et al. | Aug. 26, 1958 |
| 3,088,942 | Coover | May 7, 1963 |

FOREIGN PATENTS

| | | |
|---|---|---|
| 822,737 | Great Britain | Oct. 28, 1959 |
| 556,975 | Belgium | Oct. 25, 1957 |